(12) United States Patent
Chakravarti et al.

(10) Patent No.: US 9,624,440 B2
(45) Date of Patent: *Apr. 18, 2017

(54) USING FOSSIL FUELS TO INCREASE BIOMASS-BASED FUEL BENEFITS

(71) Applicants: Shrikar Chakravarti, East Amherst, NY (US); Raymond Francis Drnevich, Clarence Center, NY (US); Dante Patrick Bonaquist, Grand Island, NY (US); Gregory Panuccio, East Amherst, NY (US)

(72) Inventors: Shrikar Chakravarti, East Amherst, NY (US); Raymond Francis Drnevich, Clarence Center, NY (US); Dante Patrick Bonaquist, Grand Island, NY (US); Gregory Panuccio, East Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/060,965

(22) Filed: Oct. 23, 2013

(65) Prior Publication Data

US 2014/0047763 A1   Feb. 20, 2014

Related U.S. Application Data

(62) Division of application No. 13/040,459, filed on Mar. 4, 2011, now Pat. No. 8,592,492.

(Continued)

(51) Int. Cl.
*C10G 2/00* (2006.01)
*C10K 3/00* (2006.01)
(Continued)

(52) U.S. Cl.
CPC .............. *C10G 2/30* (2013.01); *C01B 3/36* (2013.01); *C01B 3/382* (2013.01); *C01B 3/384* (2013.01);
(Continued)

(58) Field of Classification Search
CPC .. C01B 3/36; C01B 3/384; C01B 3/48; C01B 3/382; C10G 2/32
(Continued)

(56) References Cited

U.S. PATENT DOCUMENTS 3,972,958 A   8/1976   Garwood et al.
4,675,344 A   6/1987   Conway et al.
(Continued)

FOREIGN PATENT DOCUMENTS

WO   WO99/55618         11/1999
WO   WO2007/009984 A1   1/2007
(Continued)

OTHER PUBLICATIONS

Anderson, R. B. et al. "Synthesis of Alcohols by Hydrogenation of Carbon Monoxide". Industrial and Engineering Chemistry, vol. 44, No. 10. (1952) pp. 2418-2424.

(Continued)

*Primary Examiner* — Jafar Parsa
(74) *Attorney, Agent, or Firm* — Iurie A. Schwartz

(57) ABSTRACT

In the production of fuel such as ethanol from carbonaceous feed material such as biomass, a stream comprising hydrogen and carbon monoxide is added to the raw gas stream derived from the feed material, and the resulting combined stream is converted into fuel and a gaseous byproduct such as by a Fischer-Tropsch reaction. The gaseous byproduct may be utilized in the formation of the aforementioned stream comprising hydrogen and carbon monoxide.

6 Claims, 7 Drawing Sheets

Related U.S. Application Data

(60) Provisional application No. 61/311,539, filed on Mar. 8, 2010.

(51) Int. Cl.

| | | |
|---|---|---|
| *C01B 3/36* | (2006.01) | |
| *C10J 3/46* | (2006.01) | |
| *C01B 3/38* | (2006.01) | |
| *C01B 3/48* | (2006.01) | |
| *C10J 3/18* | (2006.01) | |
| *C10J 3/72* | (2006.01) | |
| *C10K 3/06* | (2006.01) | |

(52) U.S. Cl.
CPC ............... *C01B 3/48* (2013.01); *C10G 2/32* (2013.01); *C10J 3/18* (2013.01); *C10J 3/463* (2013.01); *C10J 3/726* (2013.01); *C10K 3/005* (2013.01); *C10K 3/06* (2013.01); *C01B 2203/0233* (2013.01); *C01B 2203/0244* (2013.01); *C01B 2203/0255* (2013.01); *C01B 2203/0283* (2013.01); *C01B 2203/043* (2013.01); *C01B 2203/0405* (2013.01); *C01B 2203/0415* (2013.01); *C01B 2203/062* (2013.01); *C10G 2300/1011* (2013.01); *C10G 2300/807* (2013.01); *C10J 2300/0909* (2013.01); *C10J 2300/0916* (2013.01); *C10J 2300/0956* (2013.01); *C10J 2300/0959* (2013.01); *C10J 2300/0976* (2013.01); *C10J 2300/1618* (2013.01); *C10J 2300/1659* (2013.01); *C10J 2300/1846* (2013.01); *C10J 2300/1853* (2013.01); *Y02P 20/132* (2015.11); *Y02P 20/145* (2015.11); *Y02P 30/20* (2015.11)

(58) Field of Classification Search
USPC .................................................. 518/700–705
See application file for complete search history.

(56) References Cited

U.S. PATENT DOCUMENTS

| | | |
|---|---|---|
| 4,775,696 A | 10/1988 | Prada-Silva et al. |
| 4,831,060 A | 5/1989 | Stevens et al. |
| 4,882,360 A | 11/1989 | Stevens |
| 4,888,131 A | 12/1989 | Goetsch et al. |
| 5,554,351 A | 9/1996 | Primdahl |
| 6,136,577 A | 10/2000 | Gaddy |
| 6,958,363 B2 | 10/2005 | Espinoza et al. |
| 6,974,844 B2 | 12/2005 | Steynberg |
| 7,008,967 B2 | 3/2006 | Keyser et al. |
| 7,087,652 B2 | 8/2006 | Abbott et al. |
| 2008/0306171 A1 | 12/2008 | Van Hardeveld |
| 2009/0293359 A1 | 12/2009 | Simmons et al. |

FOREIGN PATENT DOCUMENTS

| | | |
|---|---|---|
| WO | WO2009/113006 A2 | 9/2009 |
| WO | WO2009/126769 A2 | 10/2009 |

OTHER PUBLICATIONS

Eilers, J. et al. "The Shell Middle Distillate Synthesis Process (SMDS)", J. C. Baltzer A. G., Scientific Publishing Company, Catalysis Letters 7 (1990) pp. 253-270.

Phillips, S. et al. "Thermochemical Ethanol via Indirect Gasification and Mixed Alcohol Synthesis of Lignocellulosic Biomass". Technical Report, NREL/TO-10-41168, Apr. 2007.

Reed & Gaur. "A Survey of Biomass Gasification—2001". $2^{nd}$ Edition, survey for the National Renewable Energy Laboratory (NREL) and Biomass Energy Foundation, published by Bef Press Books, 2001, Chapter 1, pp. 1-1 to 1-24 and Chapter 3, pp. 3-1 to 3-7, 3-17 to 3-26 and 3-46 to 3-51.

USING FOSSIL FUELS TO INCREASE BIOMASS-BASED FUEL BENEFITS

This is a divisional application of U.S. application Ser. No. 13/040,459, filed Mar. 4, 2011, which claims priority from U.S. Provisional Application Ser. No. 61/311,539, filed Mar. 8, 2010, the entire contents of which is incorporated herein by reference.

FIELD OF THE INVENTION

The present invention relates to improvements in the production of liquid fuels from solid feedstock such as biomass, coal, petroleum coke and the like.

BACKGROUND OF THE INVENTION

Liquid fuels can be derived from solid feedstock materials by a series of operations including treatment of the feedstock to produce a feed stream that is then treated to form the desired product fuel. For the case of biomass, treatment of the feed stream can involve fermentation reactions and/or can involve catalyzed synthesis of fuels from precursors such as hydrogen and carbon monoxide in the feed stream. The present invention provides improvements in the efficiency of production of liquid fuels from the biomass as well as coal, petroleum coke and the like.

BRIEF SUMMARY OF THE INVENTION

One aspect of the invention is a method, which can be adapted to use fossil fuels to increase the beneficial impact of liquid hydrocarbon fuels derived from biomass or other carbonaceous feed material on carbon dioxide emissions derived from use of fossil-based liquid hydrocarbon fuels, comprising
(A) providing fossil-fuel hydrocarbon feed;
(B) forming from said fossil-fuel hydrocarbon feed a gaseous product stream comprising hydrogen and carbon monoxide at a mole ratio of H2:CO of at least 2.0:1;
(C) adding the gaseous product stream formed in step (B) to a syngas stream containing hydrogen and CO that is derived from carbonaceous feed material, in a sufficient amount to form a mixed syngas stream having a H2:CO mole ratio greater than that of said syngas stream derived from carbonaceous feed material;
(D) converting said mixed syngas stream to form product fuel and recovering from said converting a byproduct stream comprising one or more of hydrogen, CO, water vapor, methane, and hydrocarbons containing 2 to 8 carbon atoms and 0 to 2 oxygen atoms; and
(E) reacting up to 100% of said byproduct stream in said formation of said gaseous product stream in step (B).

One preferred embodiment of the invention is a method for improving the carbon conversion efficiency of fuel production from carbonaceous feed material, comprising
(A) deriving a raw gaseous stream comprising hydrogen and carbon monoxide in a mole ratio of hydrogen:carbon monoxide of less than 2:1 from carbonaceous feed material;
(B) forming a second gaseous stream comprising hydrogen and carbon monoxide in a mole ratio of hydrogen:carbon monoxide greater than 2:1 and also comprising carbon dioxide, and combining said second gaseous stream and the stream derived in step (A);
(C) converting said combined stream into product liquid fuel, and a gaseous byproduct mixture comprising hydrogen, carbon monoxide, water vapor and methane;
(D) reacting hydrocarbon fuel and steam to form said second gaseous stream, wherein at least a portion of said gaseous byproduct mixture is combusted to produce heat which is consumed in said reaction.

Other embodiments of the invention described herein include:
(I-A) A method comprising
(A) providing a gaseous product stream which is formed from fossil-fuel-based hydrocarbon feed and which comprises hydrogen and carbon monoxide at a mole ratio of H2:CO of at least 2.0:1; and
(B) adding the gaseous product stream provided in step (A) to a syngas stream derived from carbonaceous feed material and containing hydrogen and CO, in a sufficient amount to form a mixed syngas stream having a H2:CO mole ratio higher than that of said syngas stream derived from carbonaceous feed material.
(I-B) The foregoing method (I-A), wherein up to 100% of a byproduct stream obtained from the conversion of said mixed syngas stream to form product fuel is reacted in said formation of said gaseous product stream that is provided in step (A), wherein said byproduct stream comprises one or more of hydrogen, CO, water vapor, methane and hydrocarbon containing at least 2 carbon atoms and 0 to 2 oxygen atoms.
(II-A) A method comprising
(A) providing fossil-fuel-based hydrocarbon feed;
(B) forming from said fossil-fuel-based hydrocarbon feed a gaseous product stream comprising hydrogen and carbon monoxide at a mole ratio of H2:CO of at least 2.0:1; and
(C) adding the gaseous product stream formed in step (B) to a syngas stream containing hydrogen and CO that is derived from carbonaceous feed material, in a sufficient amount to form a mixed syngas stream having a H2:CO mole ratio higher than that of said syngas stream derived from carbonaceous feed material.
(II-B) The foregoing method (I-A) also including the step of (D) reacting up to 100% of a byproduct stream obtained from the conversion of said mixed syngas stream to form product fuel in said formation of said gaseous product stream in step (B), wherein said byproduct stream comprises one or more of hydrogen, CO, water vapor, methane and hydrocarbon containing at least 2 carbon atoms and 0 to 2 oxygen atoms.
(III-A) A method comprising
(A) deriving a syngas stream from carbonaceous feed material, wherein the syngas stream contains hydrogen and CO; and
(B) adding to the syngas stream derived in step (A) a gaseous product stream comprising hydrogen and carbon monoxide, wherein the mole ratio of H2:CO of said gaseous product stream is at least 2.0:1, and wherein said gaseous product stream is formed from fossil-fuel-based hydrocarbon feed, wherein adding said gaseous product stream to said syngas stream forms a mixed syngas stream having a H2:CO mole ratio higher than that of said syngas stream derived from carbonaceous feed material.
(III-B) The foregoing method (III-A), wherein up to 100% of a byproduct stream obtained from the conversion of said mixed syngas stream to form product fuel is reacted in said formation of said gaseous product stream that is added in step (B), wherein said byproduct stream comprises one or more of hydrogen, CO, water vapor, methane and hydrocarbon containing at least 2 carbon atoms and 0 to 2 oxygen atoms.

As used herein, "fossil fuel" means product useful as fuel that is either found in deposits in the earth and used in the form as found, or produced by separatory and/or chemical processing of product that is found in deposits in the earth.

As used herein, "product fuel" means hydrocarbon material (which includes oxygenated hydrocarbon material) useful as fuel and containing product selected from the group consisting of alkanes liquid at 25 C and atmospheric pressure, alkanols liquid at 25 C and atmospheric pressure, and mixtures thereof.

As used herein, "biomass" means algae or material containing any of cellulose or hemicellulose or lignin, including but not limited to Municipal Solid Waste (MSW), wood (including cut timber; boards, other lumber products, and finished wooden articles, and wood waste including sawdust), and vegetable matter such as grasses and other crops, as well as products derived from vegetable matter such as rice hulls, rice straw, soybean residue, corn stover, and sugarcane bagasse.

As used herein, "carbon conversion efficiency" means the fraction of the total carbon in carbonaceous feed material feedstock that is converted to product fuel.

As used herein, "carbonaceous feed material" means biomass, coal of any rank (including anthracite, bituminous, and lignite), coke produced from coal of any rank, petroleum coke, or bitumen.

A unique characteristic of the subject invention relates to the use of the fossil based syngas of step (B) to enhance the startup and operability of the entire liquid production system. Biomass derived as well as coal derived syngas involve the conversion of solids to syngas. Because of difficulties associated with handling and processing of solids and because of the high operating temperatures of technologies to convert solids to syngas (generally called gasification technologies) it is rare for syngas production systems to perform at a high level of syngas availability (% of nameplate capacity actually available over a given period of time—normally an annual average is used.) Typically a single train gasification facility will have an annual availability of less than about 90%. Higher availabilities are desired to increase the product income to offset the capital cost of the overall project. Typically a second and even a third gasification unit (two operating and one spare) are included in the project to improve overall product availability and project economics. The inclusion of additional solids processing and gasification trains is capital intensive. In addition, conventional gasification systems for liquids production are generally designed with startup/auxiliary boilers to provide steam required for initiating unit operations such as feedstock drying, acid gas removal system solvent regeneration, and gasification where steam is often used as a moderator to control gasifier temperatures. Startup boilers add to the cost of the overall project. To achieve a higher level of availability at a lower capital cost and/or to minimize the capital cost associated with auxiliary (startup) boiler systems implementation of the subject invention can include providing:

a quantity of the syngas formed from the fossil-fuel hydrocarbon feed in sufficient volumes to maintain operation of the fuel production (step D) when the syngas from the gasification of carbonaceous feed material is unavailable.
   a quantity of syngas formed from the fossil-fuel hydrocarbon feed in sufficient amounts to provide for startup of the facility—startup of step (D) fuel generation and providing steam and heat requirements for startup of gasification of carbonaceous feed material (steam addition to gasifier) unit including drying as needed (drying of biomass if the facility is a biomass gasification unit.)

Thus, additional embodiments of the present invention include the following (IV-A) and (IV-B):

(IV-A) A method, comprising
   (A) providing fossil-fuel hydrocarbon feed;
   (B) forming from said fossil-fuel hydrocarbon feed a gaseous product stream comprising hydrogen and carbon monoxide at a mole ratio of $H_2:CO$ of at least 2.0:1, and preferably 2.0:1 to 10:1;
   (C) converting up to all of said gaseous product stream to form product fuel and recovering from said converting a byproduct stream comprising one or more of hydrogen, CO, water vapor, methane, and hydrocarbons containing 2 to 8 carbon atoms and 0 to 2 oxygen atoms; and
   (D) reacting up to 100% of said byproduct stream in said formation of said gaseous product stream in step (B); without adding to said gaseous product stream any other gaseous product derived from carbonaceous feed material; and thereafter
   (E) adding to the gaseous product stream formed in step (B) a syngas stream containing hydrogen and CO that is derived from carbonaceous feed material, in a sufficient amount to form a mixed syngas stream having a $H_2:CO$ mole ratio greater than that of said syngas stream derived from carbonaceous feed material;
   (F) converting said mixed syngas stream to form product fuel and recovering from said converting a byproduct stream comprising one or more of hydrogen, CO, water vapor, methane, and hydrocarbons containing 2 to 8 carbon atoms and 0 to 2 oxygen atoms; and
   (G) reacting up to 100% of said byproduct stream in said formation of said gaseous product stream in step (B).

This embodiment (IV-A) is encountered, for example, in starting up the overall fuel production operation. In this and similar situations, syngas that is processed to produce fuel is produced from fossil-fuel hydrocarbon feed, such as in a steam-methane reformer, and contains no syngas from carbonaceous feed material (such as biomass). Thereafter, syngas derived from carbonaceous feed material is added to the syngas from fossil fuel and the resulting combined syngas is fed to the fuel production unit.

(IV-B) A method wherein steps (A) through (G) of (IV-A) above are preceded by the steps of
   (a) providing fossil-fuel hydrocarbon feed;
   (b) forming from said fossil-fuel hydrocarbon feed a gaseous product stream comprising hydrogen and carbon monoxide at a mole ratio of $H_2:CO$ of at least 2.0:1;
   (c) adding the gaseous product stream formed in step (b) to a syngas stream containing hydrogen and CO that is derived from carbonaceous feed material, in a sufficient amount to form a mixed syngas stream having a $H_2:CO$ mole ratio greater than that of said syngas stream derived from carbonaceous feed material;
   (d) converting said mixed syngas stream to form product fuel and recovering from said converting a byproduct stream comprising one or more of hydrogen, CO, water vapor, methane, and hydrocarbons containing 2 to 8 carbon atoms and 0 to 2 oxygen atoms; and
   (e) reacting up to 100% of said byproduct stream in said formation of said gaseous product stream in step (b).

This embodiment (IV-B) is encountered, for example, in operation of the overall fuel production operation, when feed of syngas derived from the carbonaceous feed material and combining with the syngas formed from fossil-fuel hydrocarbon feed is interrupted. In this and similar situations, syngas that is processed to produce fuel is mixed syngas from both fossil-fuel and carbonaceous feed material, then does not include syngas from carbonaceous feed material, and then again includes syngas derived from carbonaceous feed material. The higher availability provided by the use of gaseous or liquid feeds to produce the syngas in unit (D) derive from the well established availabilities of the syngas producing technologies; steam methane reforming, autothermal reforming, steam methane reforming with secondary reforming, and partial oxidation units based on light hydrocarbon feeds.

In preferred operations, in which the stream that is converted to form fuel includes syngas derived from carbonaceous feed material, the syngas stream formed from fossil fuel in step (B) can range between 5 mole % to 75 mole % of the total syngas flow to step (D). Preferably, the syngas stream from fossil fuel formed in step (B) would range between 25 mole % to 65 mole % of the total syngas flow to step (D).

In the following description, disclosure of treatment of "a stream", such as disclosure that a stream is reacted or otherwise processed, or that a stream is fed to a processing step or is combined with another stream, is intended to include the indicated treatment of all or less than all of the stream, except where indicated otherwise herein.

DETAILED DESCRIPTION OF THE INVENTION

The following description will refer to embodiments in which biomass feed material is treated by gasification to produce fuels and especially alcohols and diesel. Those skilled in the art will recognize that this embodiment can be suitably extended to other carbonaceous feedstocks, e.g. coal, coke, petroleum coke, as well as to the production of gasoline and other Fischer Tropsch liquids. Also, this invention can be adapted to treatment of syngas derived from biomass by reaction technology other than gasification of the biomass, such as by fermentation of biomass. Where the following description refers to gasification of biomass, it should not be limited to gasification except where specifically indicated.

Figure 1:
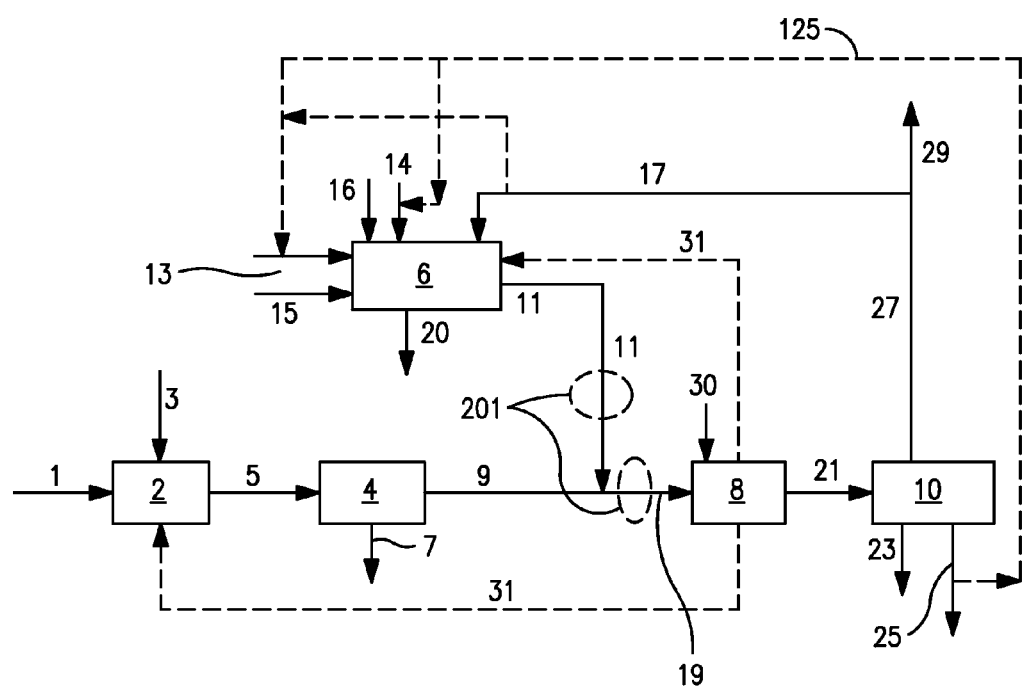
FIG. 1 is a flowsheet showing one embodiment of a method for producing fuel from biomass, incorporating the present invention.

Referring to FIG. 1, stream 1 of biomass is fed to unit 2 which may be a gasification unit. Gasification stream 3 is also fed to gasification unit 2. Stream 3 typically contains air, steam, or oxygen, or two or all three of air, steam and oxygen. Unit 2 may comprise one gasification reactor or a connected series of stages which overall achieve the desired gasification, that is, the formation of a gaseous stream 5 which contains (at least) hydrogen and carbon monoxide and which typically contains other substances such as carbon dioxide, water vapor, hydrocarbons (including methane), volatilized tars, particulate matter, and sulfides.

Typically, unit 2 comprises a moving bed gasifier, such as Lurgi® gasifiers or a fluidized bed gasifier, such as the one developed by Silvagas or GTI. Another useful type of gasifier for the biomass application, especially MSW, is the plasma-based gasifiers. A discussion of biomass gasifiers can be found in the open literature, e.g. A Survey of Biomass Gasification by Reed & Gaur, 2001. These biomass gasifiers produce synthesis gas which includes hydrogen and carbon monoxide at a molar ratio (hydrogen:carbon monoxide) of less than 2:1. The hydrogen and the carbon monoxide are generated by breakdown of the biomass material under conditions such that there is not complete oxidation to water and carbon dioxide. Gasification stream 3, which preferably contains steam and oxygen, is fed into the bed so that it passes through the biomass and contacts the biomass, heats the biomass, and promotes the aforementioned breakdown of the biomass material. Gasification stream 3 is typically fed at a temperature in the range of 100° F. to 750° F. and a pressure of 30 psia to 550 psia.

Within a moving bed gasifier, different reaction zones may be present from top to bottom, namely a drying zone where moisture is released, a devolatilization zone where pyrolysis of biomass takes place, a reduction zone where mainly the endothermic reactions occur, an exothermic oxidation or combustion zone, and an ash bed at the bottom of the gasifier. If the gasification stream contacts the biomass in a countercurrent fashion, hot dry devolatilized biomass reacts with the relatively cold incoming gasification stream, and hot raw gas before exiting as stream 5 exchanges heat with relatively cold incoming biomass.

The temperature profile in each part of a gasifier varies as the biomass moves through the different zones in the gasifier. In the gasification zone the temperature may vary between 1400° F. and 2200° F. The gas stream 5 that is produced and leaves the gasification unit 2 is typically at a temperature of between about 1000° F. and 1600° F.

In fluid bed gasifiers the biomass solids are effectively completely mixed. The temperature in all parts of the bed are essentially the same and can range from about 1200° F. and 1600° F. The gas stream 5 that is produced and leaves the gasification unit 2 is typically at a temperature of between about 1200° F. and 1600° F.

As stream 5 typically includes substances that should not be present in the stream 19 which is fed to reactor 8 as described below, stream 5 is preferably treated in conditioning stage 4 to remove impurities 7 that may be present such as particulates, tars, acid gases including $CO_2$, ammonia, sulfur species, and other inorganic substances such as alkali compounds. Impurities may be removed in one unit or in a series of units each intended to remove different ones of these impurities that are present or to reduce specific contaminants to the desired low levels. Unit 4 represents the impurities removal whether achieved by one unit or by more than one unit. This unit also includes the required cooling of the syngas. This energy can be recovered for use in other parts of the process. Details are not shown, but should be obvious to those skilled in the art. Use of a high temperature gasifier, e.g. plasma gasifier, where the syngas exits at >2000° F., reduces the complexity of unit 4. In particular, tar and methane content of syngas from high temperature gasifiers tends to be quite low to non-existent. Unit 4 thus may primarily entail cooling/heat recovery.

The primary benefits of a fluidized bed gasifier are high heat transfer rates, fuel flexibility and the ability to process feedstock with high moisture content. A variety of fluidized bed gasifiers have been and continue to be used/developed for biomass gasification. Key process parameters include type of particle, size of particle and manner of fluidization. Examples of configurations deployed for the biomass gasification application include the bubbling fluidized bed, where bubbles of gas pass through the solids, to circulating fluidized bed, where the particles are carried out with the gas, subsequently separated by a cyclone and returned to the gasifier. Fluidized bed gasifiers are operated below the ash fusion temperature of the feedstock. The generated syngas will contain impurities and thus will require conditioning similar to the moving bed gasifier described above. Tar levels may be less but still not quite as low as that from a plasma gasifier.

The resulting conditioned gaseous stream 9 from stage 4 contains at least hydrogen and carbon monoxide, in a molar ratio of hydrogen to carbon monoxide of less than 2:1. The exact composition can vary widely depending on the biomass feedstock, gasifier type and operating conditions. Stream 9 typically contains (on a dry basis) 20 to 50 vol. % of hydrogen, and 10 to 45 vol. % of carbon monoxide. Stream 9 typically also contains carbon dioxide in amounts from 3 to 35 vol. %.

Before stream 9 is fed to reactor 8, it is combined with stream 11 which is formed in reactor 6. Reactor 6 is preferably a steam methane reformer in which hydrocarbon fuel stream 13 that comprises fossil fuel 13 (e.g. natural gas, methane, naphtha, liquefied petroleum gases (LPG), preferably comprising product containing up to 8 carbon atoms) and steam 15 are fed into a reactor where they react to form gaseous product stream 11 of syngas which contains hydrogen and carbon monoxide in a molar ratio (hydrogen:carbon monoxide) of at least 2:1, preferably 2.5:1 to 10:1, and more preferably 3:1 or 4:1 to 8:1. The ratio of hydrogen to carbon monoxide in the stream 11 that is produced in reactor 6 depends on the ratio of steam to carbon fed to reactor 6 and the temperature of the gas leaving the reactor. Increasing the pressure within reactor 6 increases "methane slip" (level of unconverted hydrocarbons) and water vapor content in stream 11, both of which are undesirable. Increasing the ratio of steam to carbon fed to reactor 6 increases the ratio of hydrogen to carbon monoxide in stream 11, but can increase the overall energy requirements of the system (taking into account the incremental additional energy required to produce additional steam that is fed to reactor 6).

Gas stream 11 can be generated within a steam methane reformer by introducing the fossil-fuel hydrocarbon containing feed, typically natural gas, into steam methane reformer tubes located in a radiant section of the steam methane reformer. The reformer tubes are packed with a catalyst that is used to promote the steam methane reforming reactions. Steam methane forming reactions are endothermic and hence, heat is supplied to the reformer tubes to support the reactions by burners firing into the radiant section of the steam methane reformer. In steam methane reforming, the hydrocarbon containing stream, steam and, optionally, a recycle stream, is fed into a reactor. Commonly the reactor is formed by a bundle of tubes containing a catalyst. The tube bundle is located in a furnace and natural gas is also used as a fuel to the furnace. The following reactions take place inside the catalyst packed tubes:

$$CH_4+H_2O \Rightarrow CO+3H_2$$

$$CH_4+CO_2 \Rightarrow 2CO+2H_2$$

$$CO_2+H_2 \Rightarrow CO+H_2O$$

The crude synthesis gas product from the reactor, which contains hydrogen, carbon monoxide, and water, is cooled down to avoid the re-forming of methane from the carbon monoxide and the hydrogen.

When reactor 6 is a steam methane reformer, the product gas leaves the reformer at a temperature of about 1600° F., in which case the molar ratio of steam to carbon fed to reactor 6 should be in the range of 2.5:1 to 6:1 or even 2.0:1 to 6:1. The pressure within reactor 6 should be less than 400 psia, preferably 200 psia or lower. Another factor considered when selecting the operating pressure of the steam methane reformer is to ensure that it is above or near the pressure of the biomass-derived raw gaseous stream 9. Thus, stream 9 may optionally be compressed to the pressure of stream 11.

While it is preferable to deploy a steam methane reformer for reactor 6, it is recognized that it may be possible to practice some variations. Gas stream 11 can also be generated in a partial oxidation reactor by reaction between hydrocarbon and oxidant (e.g. oxygen), or in an autothermal reformer by reaction between hydrocarbon, oxidant and steam. In the autothermal reformer, oxygen reacts with hydrocarbons within a natural gas and steam containing feed to supply heat to support the steam methane reforming reactions in a catalyst filled zone.

In a partial oxidation reaction, the hydrocarbon containing stream, for instance, natural gas and oxygen are introduced into a partial oxidation reactor with the use of a specially designed burner. The oxygen is consumed at the reactor entrance. The residence time in the reactor is typically about 3 seconds. The overall reaction that takes place is:

$$CH_4+2O_2 \Rightarrow CO_2+2H_2O$$

The initial reaction is exothermic and produces heat and consequential temperature increases to above about 1300 degree. C. The high temperatures allow the following reforming reactions to occur without a catalyst at the main part of the reactor:

$$CH_4+H_2O \Rightarrow CO+3H_2$$

$$CH_4+CO_2 \Rightarrow 2CO+2H_2$$

$$CO_2+H_2 \Rightarrow CO+H_2O$$

In autothermal reforming, in a first reaction zone formed by a burner, natural gas, oxygen and, optionally, steam and a recycle stream containing carbon dioxide are reacted. The reaction in this first reaction zone is as follows:

$$CH_4+2O_2 \Rightarrow CO_2+2H_2O$$

The resultant intermediate product from the first reaction zone containing methane, water, and carbon dioxide, is fed to a catalyst bed below the burner where the final equilibration takes place in the following reactions:

$$CH_4+H_2O \Rightarrow CO+3H_2$$

$$CO_2+H_2 \Rightarrow CO+H_2O$$

$$CH_4+CO_2 \Rightarrow 2CO+2H_2$$

The catalyst bed may be a vessel filled with catalyst as disclosed in U.S. Pat. No. 5,554,351 or a fluid bed catalyst system such as disclosed in U.S. Pat. No. 4,888,131. In the fluid bed system disclosed in the aforesaid patent, methane and steam are fed to the bottom of the fluid bed and oxygen is fed close to the bottom but inside the fluid bed. The crude synthesis gas can be treated in separation systems such as have been discussed above with respect to partial oxidation units.

The reforming reaction of steam and the hydrocarbon fossil fuel (e.g. natural gas, methane, naphtha, LPG) consumes energy, typically provided as heat from combustion of fuel fed as stream 14 with air, oxygen, or oxygen-enriched air fed as stream 16. Combustion creates flue gas stream 20.

Table 1 quantifies the impact of the ratio of steam in stream 15 to carbon in feed stream 13, on the composition of the gas stream 11 that is produced in reactor 6, which is assumed to be a steam methane reformer assumed to operate at about 1600° F. and 100 psia (refer to FIG. 1). Lower steam to carbon ratios are envisioned when lower $H_2/CO$ ratios are needed the addition of $CO_2$ to stream 13 has a similar effect on $H_2/CO$ ratios.

TABLE 1

Impact of steam to methane ratio on syngas composition
(ratios are mole ratios)

| Steam to carbon ratio | Syngas comp. (mol. frac., dry basis) | | | | $H_2/CO$ ratio |
|---|---|---|---|---|---|
| | $H_2$ | CO | $CO_2$ | $CH_4$ | |
| 2.8 | 0.76 | 0.16 | 0.07 | 0.01 | 4.6 |
| 3.8 | 0.77 | 0.14 | 0.09 | 0.00 | 5.4 |
| 4.5 | 0.77 | 0.13 | 0.10 | 0.00 | 6.1 |
| 5 | 0.77 | 0.12 | 0.11 | 0.00 | 6.5 |
| 6 | 0.78 | 0.10 | 0.12 | — | 7.8 |

* Corresponds to generation of 100 million standard cubic feet of syngas

Stream 13 can be obtained directly from a supply of natural gas or methane. Alternatively, all or part of stream 13 can be obtained as the waste gas or offgas from another chemical or refining operation, or from sources such as landfill gas or digester gas. In some cases, all or a portion 125 of stream 25 (described later) can be directed to stream 13 for use as a hydrocarbon feedstock or stream 14 for use as fuel for reformer 6. It is preferred to feed a stream 17 comprising at least one of hydrogen, carbon monoxide and methane, to reactor 6 to be combusted as fuel to provide energy that is consumed in the reforming reaction. Stream 17 is described further below.

Streams 11 and 9 are combined to form mixed syngas stream 19, which contains hydrogen and carbon monoxide in a molar ratio of hydrogen to carbon monoxide that is higher than the mole ratio of hydrogen to carbon monoxide in stream 9. Preferably the mole ratio of hydrogen to carbon monoxide in stream 19 is at least 1.1:1, preferably at least 1.5:1, and more preferably at least 1.6:1. In other preferred embodiments, the mole ratio of hydrogen to carbon monoxide in stream 19 is within 10% of 2:1, and even more preferably up to 2.2:1. This mole ratio can be higher than 2.2:1, but at ratios higher than 2.2:1 the efficiency of the overall process begins to diminish because the production of the additional hydrogen represented by the higher ratio comes at an energy cost that is not fully compensated in the operation of the reactor 8. When the desired product fuel is an alcohol such as ethanol, it is recommended that stream 19 contain no more than 10 vol. % carbon dioxide and preferably no more than 7 vol. % carbon dioxide. Therefore, the processes by which streams 9 and 11 are produced, and the relative amounts of streams 9 and 11 that are combined to form stream 19, should be adjusted so that the carbon dioxide content of stream 19 is controlled to such desired values. Stream 19 is optionally compressed (not shown) before it is fed to reactor 8. (Streams 11, stream 9 and 11, and/or stream 19 could be depressurized through a valve or an expander if the pressure required by unit 8 is less than the pressure of streams 11 and/or 9.) The compression will be accompanied with a condensate removal system, also not shown. It is conceivable that there could be an optional carbon dioxide removal unit 201 ahead of reactor 8 to reduce carbon dioxide levels in stream 19 to less than 10 vol. % and preferably, less than 7 vol. %. The carbon dioxide removal process can be carried out with one of several commercial alternatives, which typically use a physical solvent (e.g. methanol) or a chemical solvent (alkanolamine), or which employ physical adsorbent technology such as a PSA or VPSA.

Typically stream 11 would comprise, on a dry basis, 55-80 mole % hydrogen, 10-30 mole % carbon monoxide, 5-20 mole % carbon dioxide, and 1-8 mole % methane.

Optional carbon dioxide removal units 201 can be located in stream 19 or in stream 11, as shown in FIG. 1.

Stream 19 is then fed to reactor 8 wherein product fuel is produced. Preferably, product fuel is produced by a catalytic conversion process, e.g. Fischer-Tropsch process. However, the present invention is advantageous also when the product fuel is produced by fermentation or other conversion mechanisms. Stream 19 will typically require some compression before being fed to reactor 8 depending on the pressure of stream 19. (Higher pressure gasifiers such as entrained flow technologies can result in stream 19 pressures sufficient for use in unit 8 without compression.). If the end-product is a diesel-type of fuel, a single stage of compression may suffice. For alcohols, e.g. methanol, ethanol, 2-3 stages of compression may be required. Obviously compressing the blended stream 19 provides the benefit of a reduction in the amount of equipment needed for compression versus separately compressing streams 11 and 9 to the desired pressure for reactor 8.

Considering Fischer-Tropsch conversion in general, the Fischer-Tropsch reaction may be carried out in any reactor that can tolerate the temperatures and pressures employed. The pressure in the reactor is typically between 300 psia and 1500 psia, while the temperature may be between 400° F. and 700° F. Preferably, the Fischer-Tropsch hydrocarbon synthesis stage is a high temperature Fischer-Tropsch hydrocarbon synthesis stage. The reactor will thus contain a Fischer-Tropsch catalyst, which will be in particulate form. The catalyst may contain, as its active catalyst component, Co, Fe, Ni, Ru, Re and/or Rh. The catalyst may be promoted with one or more promoters selected from an alkali metal, V, Cr, Pt, Pd, La, Re, Rh, Ru, Th, Mn, Cu, Mg, K, Na, Ca, Ba, Zn and Zr. The catalyst may be a supported catalyst, in which case the active catalyst component, e.g. Co, is supported on a suitable support such as alumina, titania, silica, zinc oxide, or a combination of any of these.

In the Fischer-Tropsch conversion, the hydrogen and carbon monoxide in stream 19 react under pressure in the presence of a catalyst at reaction temperature in the indicated range to yield a mixture of alkanols, alkanes, or both, which may contain 1 to 50 carbon atoms. Water and carbon dioxide are also produced.

As the Fischer-Tropsch reaction is exothermic, steam-producing cooling coils are preferably present in the Fischer-Tropsch reactors to remove the heat of reaction. This steam can be fed to reactor 6 as part of the steam reactant in the steam methane reforming reaction. Fresh catalyst is preferably added to reactor 8 when required without disrupting the process to keep the conversion of the reactants high and to ensure that the particle size distribution of the catalyst particles is kept substantially constant.

The manner of carrying out a variation of the Fischer-Tropsch reaction for producing alcohols from syngas is well known and has been practiced for several years. Useful disclosure is found in "Synthesis of Alcohols by Hydrogenation of Carbon Monoxide". R. B. Anderson, J. Feldman and H. H. Storch, Industrial & Engineering Chemistry, Vol. 44, No. 10, pp 2418-2424 (1952). Several patents also describe different aspects of the Fischer-Tropsch conversion process that can be practiced to produce alkanols including ethanol. For example, U.S. Pat. No. 4,675,344 provides details on process conditions, e.g. temperature, pressure, space velocity, as well as catalyst composition to optimize the Fischer-Tropsch process for increased production of C2 to C5 alcohols versus methanol. This patent also indicates that a desirable hydrogen:carbon monoxide ratio in the gas feed stream is in the range of 0.7:1 to 3:1. U.S. Pat. No. 4,775,696 discloses a novel catalyst composition and a procedure for synthesis of alcohols via the Fischer-Tropsch conversion. U.S. Pat. No. 4,831,060 and U.S. Pat. No. 4,882,360 provide a comprehensive discussion on the preferred catalyst composition and synthesis procedures for a producing a product mix with a higher ratio of C2-5 alcohols versus methanol. The catalyst is typically comprised of:

(1) A catalytically active metal of molybdenum, tungsten or rhenium, in free or combined form;
(2) A co-catalytic metal of cobalt, nickel or iron, in free or combined form;
(3) A Fischer-Tropsch promoter, e.g. alkali or alkaline earth metals such as potassium;
(4) An optional support, e.g. alumina, silica gel, diatomaceous earth. Use of the above catalyst composition provides both high production rates and high selectivities.

When the desired product fuel is methanol, the catalytic conversion is operated in any manner known to favor the formation of methanol, such as carrying out the reaction with a copper-zinc catalyst.

The overall stoichiometry for the production of alcohols from syngas using the Fischer-Tropsch process can be summarized as follows ("Thermochemical Ethanol via Indirect Gasification and Mixed Alcohol Synthesis of Lignocellulosic Biomass". S. Phillips, A. Aden, J. Jechura, D. Dayton and T. Eggeman Technical Report, NREL/TP-510-41168, April 2007):

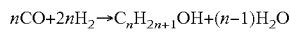

$$nCO + 2nH_2 \rightarrow C_nH_{2n+1}OH + (n-1)H_2O$$

As can be seen from this stoichiometry, the optimal molar ratio of hydrogen to carbon monoxide in the syngas is 2:1. A slightly lower ratio is compensated somewhat by the catalysts used in for mixed alcohol production (e.g. molybdenum sulfide), which are known to provide some water-gas shift activity. Occurrence of the water-gas shift reaction, shown here:

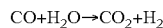

$$CO + H_2O \rightarrow CO_2 + H_2$$

in the Fischer-Tropsch reactor effectively increases the hydrogen:carbon monoxide ratio and correspondingly, increases conversion of syngas to ethanol.

Stream 19 or a portion of stream 11 can if desired be fed into one or more than one location in the reactor or reactors that form the desired fuel (not shown).

The mixture of products formed in reactor 8 is represented in FIG. 1 as stream 21. This stream 21 is treated in product recovery unit 10 to recover stream 23 of the desired product fuel, such as ethanol, as well as stream 25 of liquid and/or solid by-products (such as longer-chain alkanes and/or alkanols, e.g. naphtha), and stream 27 of gaseous byproducts. Stage 10 is shown separate from reactor 8 but in practice the Fischer-Tropsch/catalytic reaction and the ensuing separation of products may be carried in one overall processing unit which includes a series of more than one operation. Recovery of the desired product in stage 10 is carried out by distillation or other separatory techniques which are familiar to those experienced in this field.

Gaseous stream 27 comprises at least one of hydrogen, carbon monoxide, water vapor, and light hydrocarbons such as methane and/or C2-C8 hydrocarbons with 0 to 2 oxygen atoms. For each component of stream 27, the entire amount thereof may have been formed in reactor 8, or the entire amount may have been fed to reactor 8 and not reacted therein, or the amount of the component may be a combination of amounts formed and amounts fed to reactor 8 and not reacted therein. Stream 17, which is at least a portion or possibly all of stream 27, is fed to reactor 6 as fuel (to generate heat that is consumed in the endothermic steam-methane reforming reaction), as reactant in the steam-methane reforming reaction, or both, as shown in FIG. 1, to promote the formation of stream 11. Any of stream 27 that is not fed to reactor 6 constitutes stream 29 which is flared, combusted, or fed to another operation to take advantage of its components and/or its energy value. Additionally, all or a portion 125 (preferably liquid) of byproduct stream 25 can be directed to stream 13 for use as hydrocarbon feedstock in reformer 6 or to stream 14 for use as fuel for reformer 6. This is especially the case when the desired product fuel is a long chain hydrocarbon or diesel and thus results in generation of naphtha in stream 25.

Steam (stream 31) formed from water stream 30 that is used to remove heat from reactor 8 can be optionally fed to gasification stage 2, or optionally can be fed to reactor 6 as a reactant for the steam methane reforming reaction. Additional steam will be generated in the gas cooling sections of units 4 and 6 that can be used along with or in place of the steam generated in unit 8.

Figure 2:
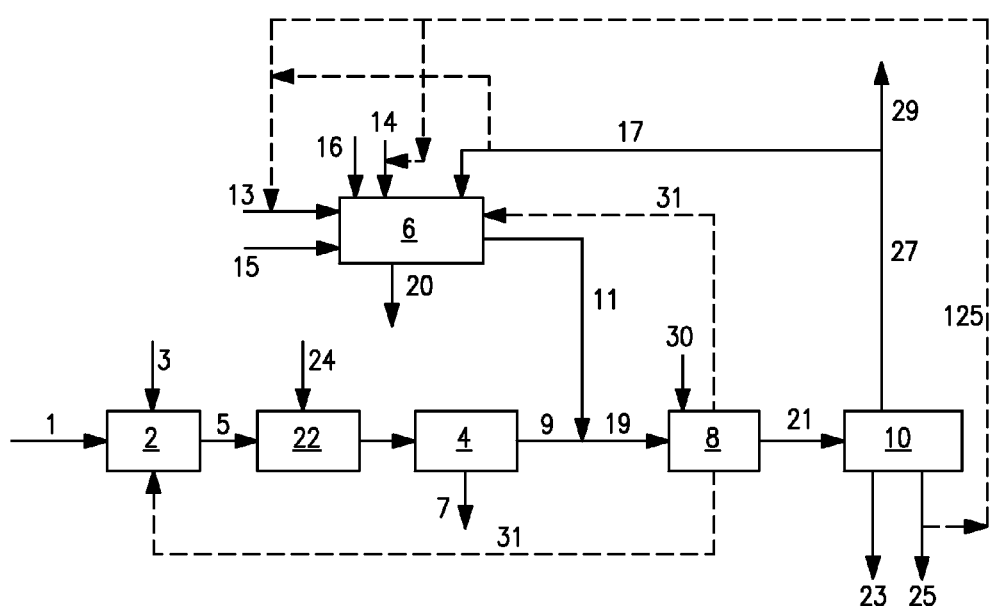
FIG. 2 is a flowsheet showing an alternative embodiment of the present invention.

FIG. 2 shows an alternative embodiment, in which stream 5 produced in the gasification stage 2 is partially oxidized in partial oxidation stage 22 by reaction with oxygen or oxygen-enriched air stream 24. Partial oxidation is carried out to convert tars, methane and hydrocarbon species, e.g. $C_2H_4$, $C_3$s, present in stream 5 to more hydrogen and carbon monoxide. This embodiment is preferred when the Fischer-Tropsch reactor 8 generates a significant amount of methane and other light gaseous hydrocarbons as a by-product. This is especially the case when the desired product from the Fischer-Tropsch reactor is a longer-chain hydrocarbon or diesel fuel. In this case, reactor 8 typically operates at pressures in the range of 300-500 psia, which is lower than the pressure for the case of methanol, ethanol or mixed alcohol production. It is to be noted that in some cases when the desired product is an alcohol or mixture of alcohols, the Fischer-Tropsch reactor 8 may generate methane and other light gaseous hydrocarbons as by-product and the embodiment shown in FIG. 2 may be preferred over the embodiment shown in FIG. 1. Alternatively, unit 22 could be unit based on autothermal reforming technology.

Figure 7:
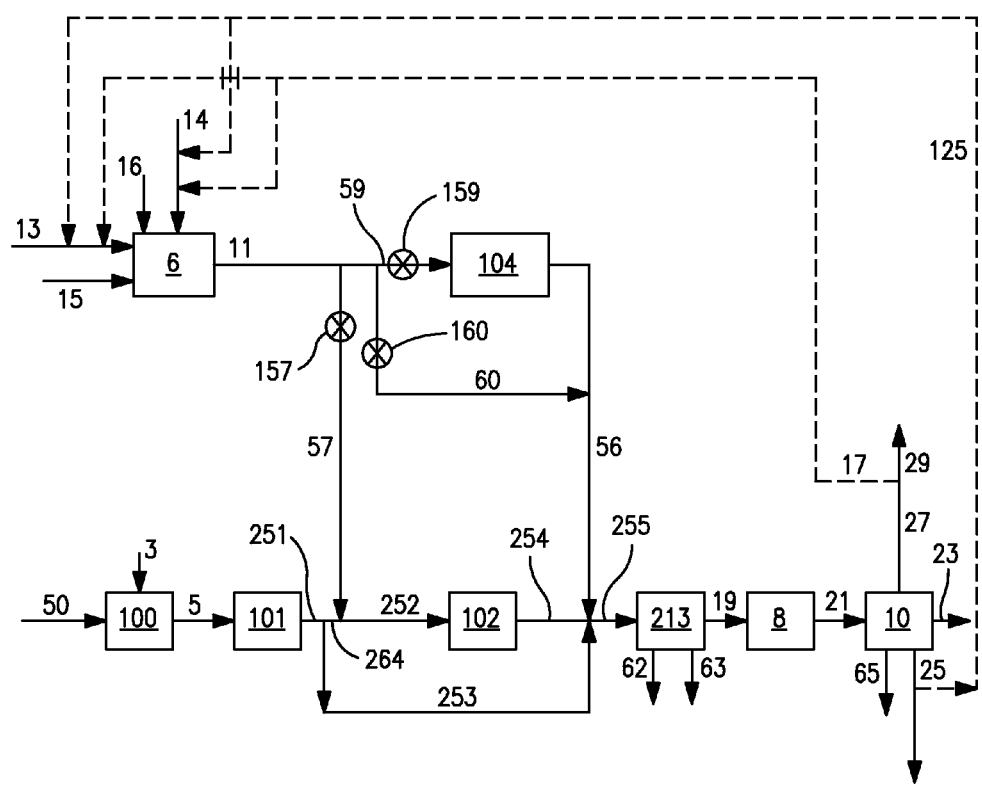
FIG. 7 is a flowsheet showing another alternative embodiment of the present invention.

FIG. 7 shows additional alternative embodiments of the current invention, which are particularly useful when coal, petroleum coke, or the like is used as gasifier hydrocarbon feedstock. Hydrocarbon feedstock stream 50 (preferably as a stream of particulate solids that may or may not be mixed with water to form a slurry) is fed to gasifier 100. Gasifier 100 is any commercially available gasifier that is used to convert coal, petroleum coke, or similar hydrocarbon feed material to syngas (e.g. those made by General Electric, Conoco Phillips, Shell, Siemens, etc.). Coal gasifiers typically operate at higher pressures than biomass gasification units. Operating pressures for coal gasifiers typically range from 300 to 1500 psig and more typically from 500 to 1100 psig. Also, coal gasifiers are typically of the entrained-flow type. Streams 3 and 5 are as defined above except that stream 3 will not contain steam.

Unit 101 comprises syngas cleanup and cooling or heating depending on the type of gasifier 100. For example, if gasifier 100 is an entrained-flow quench-cooled gasifier, then unit 101 will be a scrubber that is used to remove particulates, halides and other contaminants. A portion of the syngas stream 251 exiting unit 101 is stream 264 which is combined with stream 57 (if stream 57 is present, as discussed herein) to form stream 252. Stream 252 is reacted in water-gas shift reactor 102 where CO is converted to $CO_2$ according to the reaction given previously. A second portion of stream 251 is stream 253 which bypasses shift reactor 102. The quantity of gas in stream 253 is set such that stream 19 exhibits the desired $H_2$:CO ratio which is described herein. Product stream 254 from shift reactor 102 is combined with bypass stream 253 and syngas stream 56 (if stream 56 is present, as discussed herein) to form stream 255 which is preferably fed to acid gas removal unit 213 where acid gas such as hydrogen sulfide and carbon dioxide is removed as stream 62. If desired, carbon dioxide may be removed as stream 63 separately from other acid gases in stream 62. Acid gas removal can be carried out with any commercially available technology (e.g. "Rectisol" or "Selexol" technology) based on physical solvents (e.g. methanol) or chemical solvents (e.g. alkanolamines). The quantity of $CO_2$ recovered from stream 255 into stream 63 will depend on several factors including minimum carbon sequestration requirements and market demand for $CO_2$ for applications such as enhanced oil recovery (EOR).

The processing from stream 19 onward is generally as described in previous embodiments. Typically, unit 8 comprises a chemical conversion process whereby syngas stream 19 is converted to desired hydrocarbon products along with gaseous and liquid hydrocarbon byproducts and water-based liquid byproducts. Separation processes are utilized within unit 10 to separate the desired hydrocarbon product 23 from liquid/solid hydrocarbon byproduct stream 25, gaseous hydrocarbon byproduct stream 27, and water-based byproduct stream 65. All of or a portion 125 of liquid byproduct stream 25 may be combined with reactor 6 hydrocarbon feed stream 13 or with fuel stream 14, as indicated by dashed lines in FIG. 3. Similarly, all of or a portion 17 of gaseous hydrocarbon byproduct stream 27 may be combined with reactor 6 hydrocarbon feed stream 13 or fuel stream 14. It is recognized that streams 25 and 27 could constitute streams 13 or 14 in entirety. The total carbon conversion efficiency of the process is improved by recycling the hydrocarbon byproducts to reactor 6 for the production of syngas stream 56 which eventually produces desired hydrocarbon product stream 23.

In the treatment of a gas stream derived from coal, coke, or bitumen, units 8 and 10 may represent several synthesis and separation steps arranged in series or in parallel. For example, syngas stream 19 may initially be converted to an intermediate product that contains impurities. The desired intermediate product will be separated from unwanted byproducts within unit 10. The desired intermediate product will be returned to unit 8 for further chemical conversion to desired hydrocarbon product and byproducts. The desired hydrocarbon product will be separated from the byproducts within unit 10. The total gaseous hydrocarbon byproducts can be combined to form stream 27 while the total liquid hydrocarbon byproducts can be combined to form stream 25 and the total water-based byproducts can be combined to form stream 65. The desired hydrocarbon product will form stream 23. For example, unit 8 could represent a Fischer-Tropsch synthesis reactor as has been described previously. Alternatively, unit 8 could represent a methanol synthesis reactor that is followed by a methanol-to-gasoline converter. The intermediate methanol product may be purified within unit 10 before being sent back to the methanol-to-gasoline converter feed within unit 8. These details are omitted from FIG. 3, but are familiar to those skilled in the art.

The operating pressure of reactor 6 should be optimized to balance the effects of methane slip against syngas compression.

As mentioned above, in some embodiments, such as starting up, and interruptions of syngas feed derived from the biomass or other carbonaceous feed material, no syngas from stream 9 is fed to unit 8, and stream 11 provides 100% of stream 19.

Figure 3:
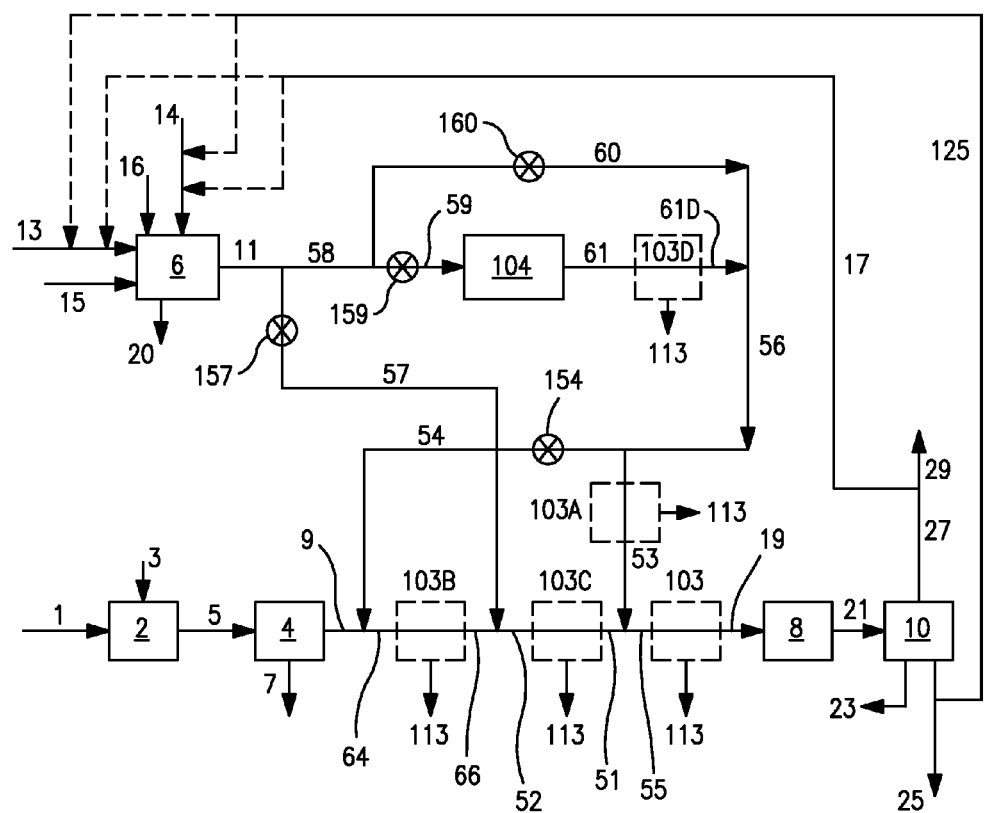
FIG. 3 is a flowsheet showing another alternative embodiment of the present invention.

Reference is now made to FIG. 3, which illustrates embodiments in which all or a portion of stream 11 can be reacted in a reactor such as a water-gas shift reactor to produce a stream having a higher hydrogen content, and a higher carbon dioxide content, than the stream that is fed to the reactor.

In these embodiments, a portion of stream 11 can be fed as stream 57 into the biomass-derived syngas stream (shown as stream 9, 64 or 66) to form stream 52. The portion of stream 11 (which may be all of stream 11) that is not stream 57 constitutes stream 58. All of or a portion of stream 58 is fed as stream 59 to reactor 104 where hydrogen-enriched stream 61 is formed (such as by the well-known water gas shift reaction). Stream 61 has a higher hydrogen content than stream 59, and contains carbon dioxide (including carbon dioxide produced in reactor 104). All of or a portion of stream 58 can bypass reactor 104 as stream 60. Stream 56 is formed by combining streams 60 and 61. Hydrogen-enriched stream 54 can be taken from stream 56 and fed into the biomass-derived syngas stream 9. Stream 56, or stream 53 which remains of stream 56 after stream 54 is taken off, can be combined with stream 51 to form stream 55.

Typically stream 61 would comprise, on a dry basis, 60-90 mole % hydrogen, 2-15 mole % carbon monoxide, 10-30 mole % carbon dioxide, and 1-8 mole % methane.

The streams shown in FIG. 3 represent possible ways that a hydrogen-enriched stream from reactor 104 can be fed into a gaseous product stream described herein containing hydrogen and carbon monoxide, and/or into the syngas stream derived from biomass, and/or into the mixed syngas stream described herein. At least one of streams 53, 54, and 57 must be flowing. Streams 54, 57, 59 and 60 if present are preferably provided with controls represented as valves 154, 157, 159 and 160, respectively, to control the amounts of gas flowing in each of streams 54, 57, 59 and 60, and to control whether any gas flows at all in each of these streams. It will be recognized that any one or two of: stream 57 and valve 157; stream 60 and valve 160; and streams 59 and 61, reactor 104, and valve 159; may be completely omitted.

As pointed out above, where streams that are to be combined have different pressures, the stream that is at a lower pressure may be subjected to compression and condensate removal before the streams are combined.

As the reaction in reactor 104 also produces carbon dioxide, it is preferable to remove at least some of this carbon dioxide so that it is not fed into reactor 8. The carbon dioxide removal can be carried out by feeding stream 55 into carbon dioxide removal unit 103. Alternatively, depending on which streams shown in FIG. 3 are present and flowing, carbon dioxide removal units can be provided in other streams, such as unit 103A to which is fed stream 56 and which produces stream 53; unit 103B to which is fed stream 64 (formed by combining stream 9 with stream 54) and which unit produces stream 66; unit 103C to which is fed to stream 52 (formed by combining stream 57 with stream 64) and which produces stream 51; and/or unit 103D to which is fed stream 61 formed in reactor 104 and which produces stream 61D. If any of 103B, 103C, or 103 are used to remove $CO_2$ then the $CO_2$ removal capability identified as part of unit 4 would likely not be included.

Carbon dioxide removal can be carried out using any known available technology (e.g. "Rectisol" or "Selexol" technology) based on physical solvents (e.g. methanol) or chemical solvents (e.g. alkanolamines) or physical adsorbents (PSA or VPSA technology). The quantity of carbon dioxide removed should be sufficient so that stream 19 fed to reactor 8 does not contain amounts of carbon dioxide high enough to interfere with the desired fuel production. Typically, the carbon dioxide content of stream 19 should be less than 10 vol. % and more preferably less than 7 vol. %. Carbon dioxide separated in any of units 103, 103A, 103B, 103 C and 103D (shown as 113) can be vented or used for other industrial operations or for end-uses such as enhanced oil recovery. The carbon dioxide content of any stream 113 is typically at least 90 vol. % on a dry basis. A portion could be recycled to reactor 6 to reduce the $H_2/CO$ ratio of stream 11.

Figure 4:
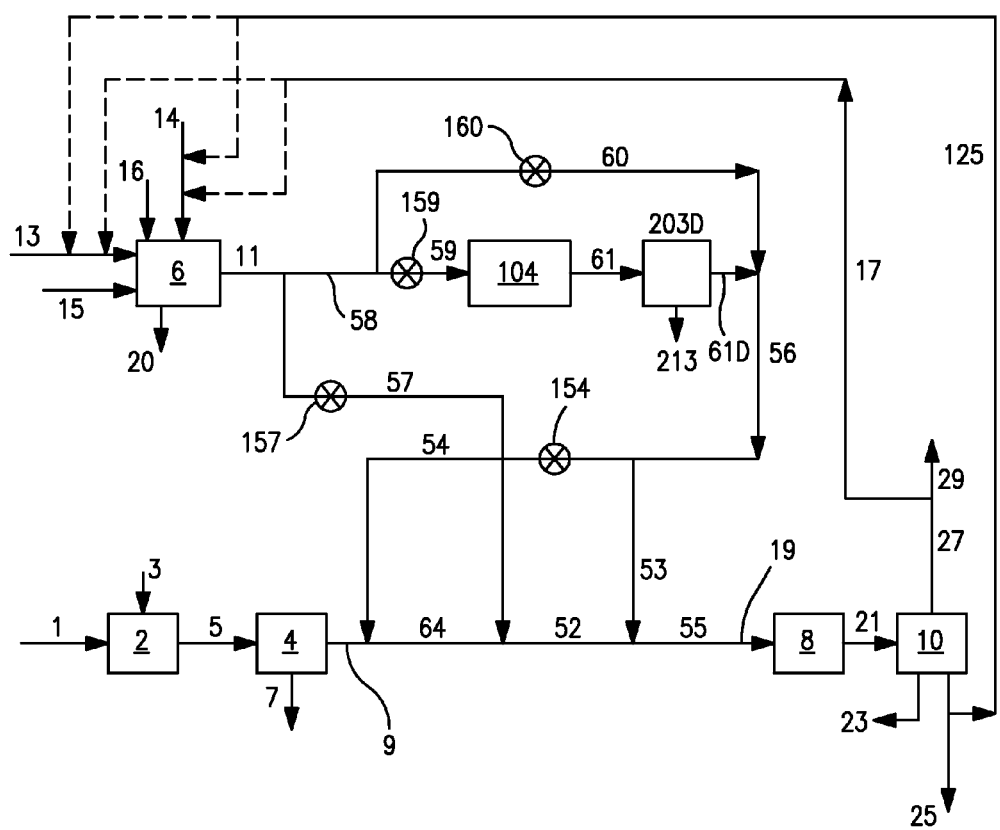
FIG. 4 is a flowsheet showing another alternative embodiment of the present invention.

FIG. 4 is similar to FIG. 3 and illustrates possibilities that take advantage of the production of the additional hydrogen that reactor 104 produces. Optionally, one may wish to recover some of this produced hydrogen, while still leaving enough hydrogen in the system so that stream 19 contains sufficient hydrogen relative to the carbon monoxide present so that the desired fuel production can be carried out in reactor 8.

Figure 5:
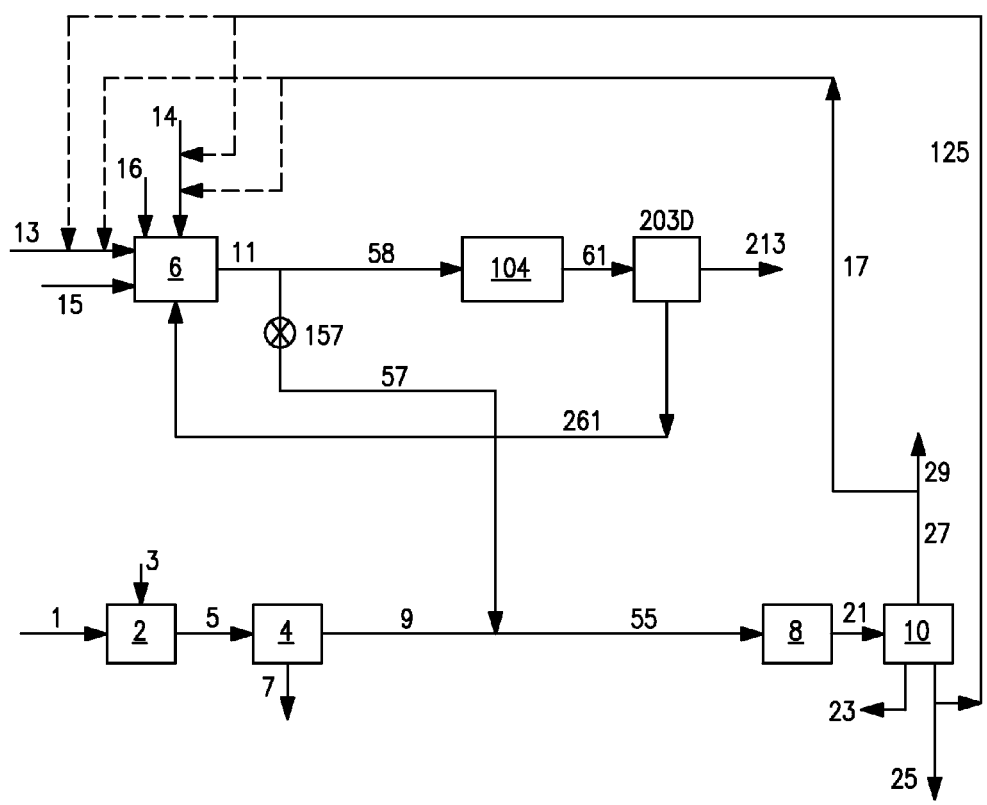
FIG. 5 is a flowsheet showing another alternative embodiment of the present invention.

Thus, in FIG. 4, reference numerals that also appear in FIG. 3 have the same meanings as for FIG. 3. When it is desired to recover a separate stream having a high hydrogen content, units that separate a hydrogen product stream from the stream fed to the respective unit can be located at any of the locations shown in FIG. 3 as 103, 103A, 103B, 103C and 103D. However, the preferred location for a unit to recover a hydrogen product stream is shown in FIG. 4 as 203D, and stream 213 represents the hydrogen product stream that is separately recovered. Hydrogen can be separated from any of the feed streams shown in FIG. 4, by known technology such as physical adsorption employing PSA (pressure swing adsorption) technology as shown in FIG. 5. Tail gas from 203D (FIG. 5 stream 261) would be sent to unit 6 as fuel. Alternatively, 203D could be a membrane unit allowing 61D to be mixed with stream 60 to form stream 56. In this situation unit 103D shown in FIG. 3 would be placed after 203D in stream 61D. With a PSA, the hydrogen content of any stream 213 is typically at least 99 vol. % on a dry basis. If a polymeric membrane is used to produce hydrogen then stream 213 would need further processing (generally by a PSA) to provide hydrogen with low concentrations of CO plus $CO_2$ (generally the concentration is limited to less than 10 ppmv.) If an advanced hydrogen membrane based on materials that transport only hydrogen across the membrane (materials such as palladium and palladium alloys) are used then no additional purification will be needed. In most cases, membrane separation units will require compression of the hydrogen stream prior to further processing or use. The hydrogen that is recovered can be used in other industrial or refining operations including stage 10 or reactor 8.

FIG. 5 illustrates another embodiment, in which a portion of stream 11 but less than all of stream 11 is fed as stream 58 to reactor 104 (such as a water-gas shift reactor) which processes stream 58 to produce stream 61 which has a higher hydrogen content than stream 58. Stream 61 is fed to unit 203D which separates stream 61 into a hydrogen product stream 213, and a second product stream 261 which is fed to reactor 6. Unit 203D employs any known technology such as physical adsorption technology, preferably PSA technology. The hydrogen that is recovered can be used in other industrial or refining operations including stage 10 or reactor 8.

The present invention provides numerous advantages.

The invention increases conversion of carbon monoxide generated in the biomass treatment step (e.g. the gasification step) to product fuel which increases the output of the desired product fuel, e.g. ethanol, methanol, diesel, by virtue of the increase in the hydrogen:carbon monoxide ratio in the syngas fed to the catalytic/Fischer-Tropsch reactor.

An advantage is that the methodology described herein can be adjusted, in that the processing conditions can be adjusted in response to changes in the characteristics of the biomass, or changes in the desired product fuel (i.e. changes in the relative proportions of the different components of the fuel produced).

Another advantage of the invention relates to the impact of the addition of the hydrogen-rich syngas stream 11 on the overall carbon footprint of the facility that transforms biomass into fuel, as quantified in terms of $CO_2$ emissions avoided. The fuel such as ethanol produced from this facility reduces anthropogenic $CO_2$ emissions by replacing an equivalent amount of gasoline used as fuel in automobiles. Thus, increasing the fuel (ethanol) output of the facility through addition of the relatively hydrogen-rich stream 8 has a positive impact, i.e. net $CO_2$ emissions avoided increases, even taking into account the likelihood that the hydrogen-rich stream is typically produced from a fossil fuel, e.g. natural gas, in a way that results in additional $CO_2$ emissions. The present invention enables reliance on selecting the process conditions for the syngas production reactor (reactor 6) so as to maintain or preferably increase the net $CO_2$ emissions avoided as compared to the base gasified biomass-to-fuel process without addition of the hydrogen-rich syngas stream.

Figure 6:
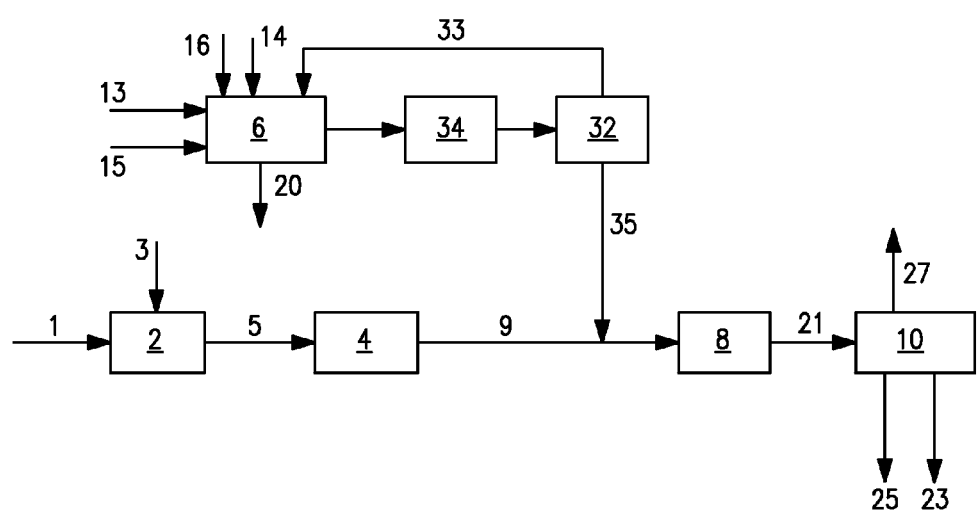
FIG. 6 is a flowsheet showing a comparative embodiment of a method of producing fuel from biomass.

Among other advantages of the present invention, fewer unit operations are needed for generation of the hydrogen-rich stream 11 versus more than 99% $H_2$ (stream 35 in FIG. 6). The system for generating the hydrogen-rich stream 11 allows an easier way to optimize catalyst selectivity to drive the liquid fuel-forming reactions instead of reliance on the water-gas shift.

In addition, the present invention achieves these advantages at low capital cost owing to needing fewer and less complex unit operations as compared to other possible approaches. Operating costs are reduced because of the increased fuel (e.g. ethanol) production from what is otherwise the same system.

There are alternatives to the source of stream 13 in addition to what is described above.

For cases where the end product from the Fischer-Tropsch reactor is a long-chain hydrocarbon or diesel fuel, byproduct stream 25 (see FIG. 2) contains naphtha. All or a portion 125 of this stream can be fed to reactor (reformer) 6 as fuel or feedstock.

For cases where methanol is the desired product from reactor 8, there may be an accompanying downstream process (not shown) that converts methanol to gasoline. All or a portion of the liquefied petroleum gases (LPG) generated as a byproduct from the conversion of methanol to gasoline can be fed to reactor 6 as feedstock (stream 13) and fuel (stream 14).

It should be recognized that in all the embodiments discussed that unit 8 could receive enough syngas from unit 6 to remain operational even though unit 2 is not producing syngas.

EXAMPLE 1

A simulation was based on a biomass-to-fuel facility assumed to process 1500 tons/day of biomass. The biomass feedstock is assumed to have a carbon content of 40%. The biomass gasifier is assumed to operate at a high temperature, e.g. >2000° F. Consequently, the biomass-derived syngas is expected to contain negligible amounts of tar, methane and other hydrocarbons. For purposes of illustration here, the composition of the biomass-derived syngas is assumed to be 44% CO, 2.4% $CO_2$, 49.1% $H_2$ and 4.5% $H_2O$. For the base case, i.e. no addition of stream 11 to the syngas, the ethanol production is estimated to be 46.5 million gallons per year. The conversion reactor is assumed to operate at 482° F. and 1500 psia.

Two alternatives for hydrogen-rich streams were considered, so as to raise the H2:CO ratio in stream 19 (see FIG. 1) to 1.8:1:

1. Alternative 1: 23 MMSCFD of >99.9% $H_2$ (<10 ppm CO, $CH_4$, $CO_2$). Such a stream can be produced by the system shown in FIG. 6, which consists of a steam methane reformer 6 followed by a shift reactor 34 and $H_2$ pressure swing adsorption 32. In this case, the tail gas 33 from the pressure swing adsorption unit 32 is recycled to the steam methane reformer 6 to be used as fuel to be combusted to provide heat energy to the reforming reaction. The stream containing >99.9% $H_2$ is blended with stream 9 prior to feeding to conversion reactor 8.
2. Alternative 2: 55 MMSCFD of syngas containing 74.2% $H_2$, 15.9% CO, 7.2% $CO_2$, 1.6% $CH_4$, 0.2% $N_2$, 0.9% $H_2$. Such a stream can be generated by a steam methane reformer 6 as shown in FIG. 1. The $H_2$-rich syngas stream 11 is blended with stream 9 prior to feeding to conversion reactor 8. In this case, the tail gas stream 27 from the conversion reactor is fed to the steam methane reformer to be used as fuel to be combusted to provide heat energy to the reforming reaction.

Table 2 illustrates the impact of addition of each of the two alternative hydrogen-rich streams. Clearly, addition of either type of hydrogen-rich stream enhances the ethanol output. However, addition of the hydrogen-rich syngas stream provides twice the increase in ethanol output, i.e. about 63% versus about 31% with addition of essentially pure hydrogen. This translates to commensurate improvements in process yield (gallons of ethanol per ton of biomass fed) and in carbon conversion efficiency. Further, addition of hydrogen-rich syngas enables an improvement in the carbon footprint, i.e. increases net $CO_2$ emissions avoided by 90 tons/day versus the base case. For the case of pure hydrogen addition, the $CO_2$ emissions in producing the hydrogen outweigh the benefits of reduced $CO_2$ emissions due to the additional ethanol being generated. Net $CO_2$ emissions avoided decreases by 145 tons/day versus the base case. This trend can also be noted by tracking the tons of $CO_2$ emissions avoided per ton of carbonaceous feed material (e.g. biomass) in each of the three cases.

It should also be recognized that using high-purity hydrogen to increase the yield through raising the hydrogen to CO ratio does not enable operation of the facility while the biomas syngas unit is unavailable. In addition, although steam would be made available during startup the hydrogen would not enable the start of the liquid production unit (8) until the biomass syngas generator becomes operational. The hydrogen would need to be flared or used as a fuel while the biomass system is made operational.

TABLE 2

Impact of addition of H2-rich stream to syngas fed to F-T process for high temperature gasifier

|  | Base | H2 Addition | Syngas Addition |
|---|---|---|---|
| Ethanol production, Million gallons per year | 80 | 105 | 130 |
| Process yield, gal ethanol/ton biomass | 149 | 193 | 241 |
| CO2 emissions avoided for equivalent gasoline, tons/day | 1435 | 1865 | 2330 |
| CO2 emissions from fossil input to generate H2/syngas, tons/day |  | 575 | 805 |
| Net CO2 emissions avoided, tons/day | 1435 | 1290 | 1525 |
| Tons CO2 avoided per ton of biomass | 0.96 | 0.86 | 1.02 |

EXAMPLE 2

Example 2 is analogous to Example 1 with the key difference being that the gasifier is assumed to operate at a lower temperature, typically 1500° F. Consequently, the biomass-derived gas stream 5 contains significant amounts of methane, higher hydrocarbons (C2's, C2+) and tars. For purposes of illustration here, the composition of the biomass-derived syngas is assumed to be 14% CO, 34% $CO_2$, 22% $H_2$, 13% $H_2O$, 15% $CH_4$ and 2% $C_2H_4$. Since a significant portion of the energy is in the form of hydrocarbons, the syngas stream 5 is directed to a PDX reactor (see block 22 in FIG. 2) to enable reforming of the hydrocarbons. The resultant stream 105 has the composition 23.4% CO, 25.5% $CO_2$, 30.5% $H_2$, 15.6% $H_2O$ and 5% $CH_4$. Since the H2/CO ratio is 1.3, for the base case it is assumed that block 4 includes a shift reactor to shift adequate amounts of CO to H2 to raise the H2/CO ratio to 2:1 prior to feeding to reactor 8. In this case, with no addition of stream 11 to the syngas, the ethanol production is estimated to be 53.9 million gallons per year.

Two alternatives for hydrogen-rich streams were considered, identical to those in Example 1. The amounts added were adjusted to increase the overall H2/CO ratio in stream 19 to 2:1. Thus, the two alternatives considered were:

1. Alternative 1: 14.1 MMSCFD of >99.9% $H_2$ (<10 ppm CO, $CH_4$, $CO_2$).
2. Alternative 2: 31.9 MMSCFD of syngas containing 74.2% $H_2$, 15.9% CO, 7.2% $CO_2$, 1.6% $CH_4$, 0.2% $N_2$, 0.9% $H_2$.

Table 3 illustrates the impact of addition of each of the two hydrogen-rich streams. Increase in ethanol yield with the addition of H2-rich syngas is twice that of the yield increase with H2 addition. Further net CO2 emissions avoided increases by 82 tons/day with syngas addition versus the base case. By contrast, net CO2 emissions avoided decreases by 74 tons/day with H2 addition versus the base case.

TABLE 3

Impact of addition of H2-rich stream to syngas fed to Fischer-Tropsch process for moderate temperature gasifiers

| | Base | H2 Addition | Syngas Addition |
|---|---|---|---|
| Biofuel production, Million gallons of ethanol equivalents per year | 53.9 | 69.6 | 87 |
| Process yield, gal ethanol/ton biomass | 108 | 139 | 174 |
| CO2 emissions avoided for equivalent gasoline, tons/day | 953 | 1231 | 1539 |
| CO2 emissions from fossil input to generate H2/syngas, tons/day | | 352 | 504 |
| Net CO2 emissions avoided, tons/day | 953 | 879 | 1035 |
| Tons CO2 avoided per ton of biomass | 0.70 | 0.64 | 0.76 |

Again as in the case with Example 1, it should be recognized that using hydrogen to increase the yield through raising the hydrogen to CO ratio does not enable operation of the facility while the biomass syngas unit is unavailable. In addition, although steam would be made available during startup the hydrogen would not enable the start of the liquid production unit (8) until the biomass syngas generator becomes operational. The hydrogen would need to be flared or used as a fuel while the biomass system is made operational.

What is claimed is:

1. A method comprising
(A) providing a gaseous product stream which is formed from fossil-fuel-based hydrocarbon feed and which comprises hydrogen and carbon monoxide at a mole ratio of H2:CO of at least 2.0:1;
(B) forming a syngas stream that is derived from carbonaceous feed material and subjecting this syngas stream to partial oxidation; and
(C) adding the gaseous product stream provided in step (A) to the partially oxidized syngas stream derived from carbonaceous feed material and containing hydrogen and CO, in a sufficient amount to form a mixed syngas stream having a H2:CO mole ratio higher than that of said partially oxidized syngas stream derived from carbonaceous feed material.

2. A method according to claim 1, wherein up to 100% of a byproduct stream obtained from the conversion of said mixed syngas stream to form product fuel is reacted in said formation of said gaseous product stream that is provided in step (A), wherein said byproduct stream comprises one or more of hydrogen, CO, water vapor, methane and hydrocarbon containing at least 2 carbon atoms and 0 to 2 oxygen atoms.

3. A method comprising
(A) providing fossil-fuel-based hydrocarbon feed;
(B) forming from said fossil-fuel-based hydrocarbon feed a gaseous product stream comprising hydrogen and carbon monoxide at a mole ratio of H2:CO of at least 2.0:1;
(C) forming a syngas stream that is derived from carbonaceous feed material and subjecting this syngas stream to partial oxidation; and
(D) adding the gaseous product stream formed in step (B) to the partially oxidized syngas stream derived from carbonaceous feed material, in a sufficient amount to form a mixed syngas stream having a H2:CO mole ratio higher than that of said partially oxidized syngas stream derived from carbonaceous feed material.

4. A method according to claim 3, also including the step of
(D) reacting up to 100% of a byproduct stream obtained from the conversion of said mixed syngas stream to form product fuel in said formation of said gaseous product stream in step (B), wherein said byproduct stream comprises one or more of hydrogen, CO, water vapor, methane and hydrocarbon containing at least 2 carbon atoms and 0 to 2 oxygen atoms.

5. A method comprising
(A) deriving a syngas stream from carbonaceous feed material, wherein the syngas stream contains hydrogen and CO and subjecting the syngas stream to partial oxidation; and
(B) adding to the syngas stream derived in step (A) a gaseous product stream comprising hydrogen and carbon monoxide, wherein the mole ratio of H2:CO of said gaseous product stream is at least 2.0:1, and wherein said gaseous product stream is formed from fossil-fuel-based hydrocarbon feed,
wherein adding said gaseous product stream to said partially oxidized syngas stream forms a mixed syngas stream having a H2:CO mole ratio higher than that of said partially oxidized syngas stream derived from carbonaceous feed material.

6. A method according to claim 5, wherein up to 100% of a byproduct stream obtained from the conversion of said mixed syngas stream to form product fuel is reacted in said formation of said gaseous product stream that is added in step (B), wherein said byproduct stream comprises one or more of hydrogen, CO, water vapor, methane and hydrocarbon containing at least 2 carbon atoms and 0 to 2 oxygen atoms.

* * * * *